Aug. 20, 1957     D. DE ZURIK     2,803,426
VALVES
Filed Dec. 19, 1950     3 Sheets-Sheet 1

INVENTOR.
DAVID DeZURIK
BY
Paul, Paul + Moore
ATTORNEYS

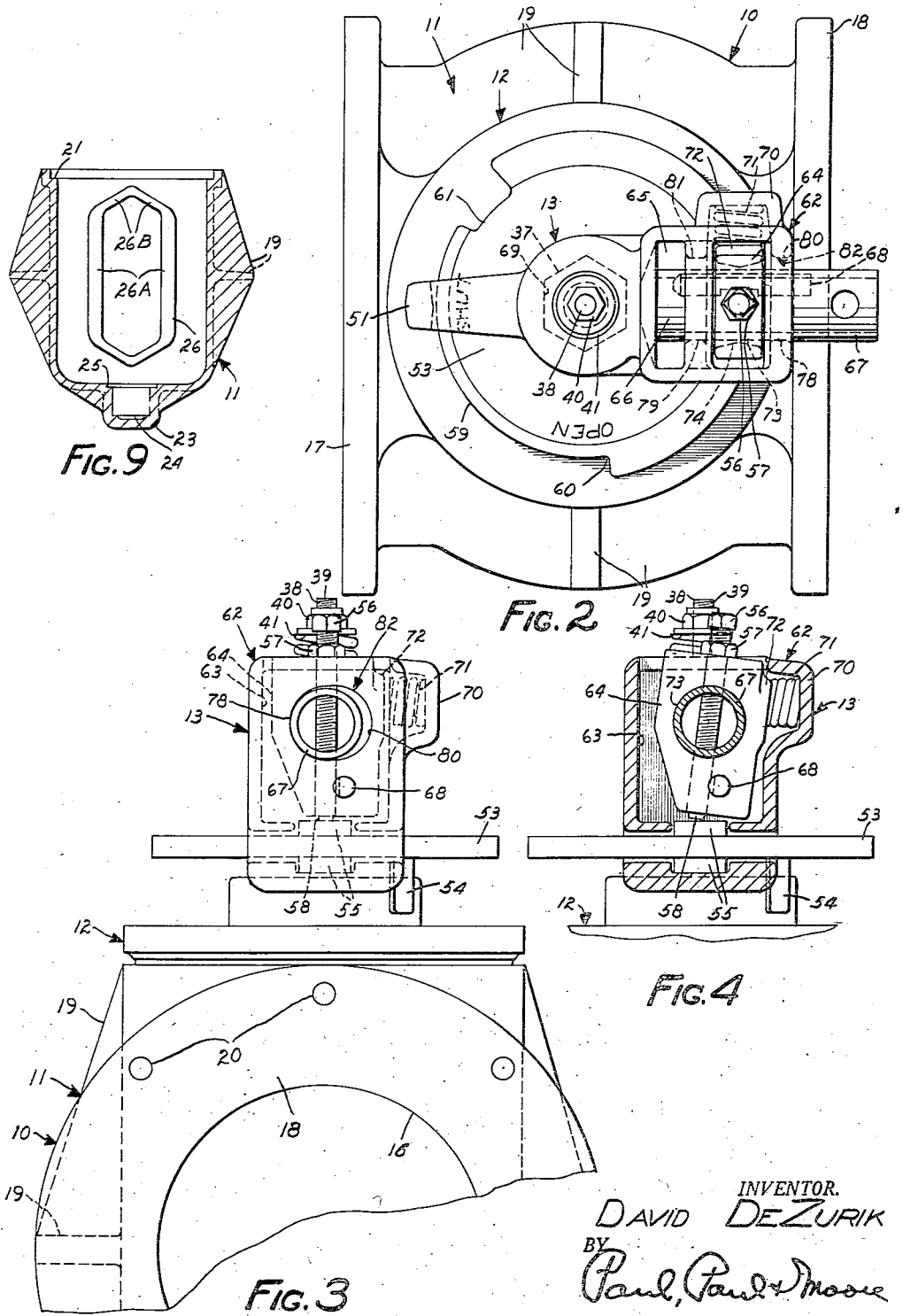

Aug. 20, 1957  D. DE ZURIK  2,803,426
VALVES
Filed Dec. 19, 1950  3 Sheets-Sheet 3

INVENTOR.
DAVID DE ZURIK
BY Paul, Paul & Moore
ATTORNEYS

United States Patent Office 2,803,426
Patented Aug. 20, 1957

2,803,426

VALVES

David De Zurik, Sartell, Minn., assignor to De Zurik Shower Company, Sartell, Minn., a corporation of Minnesota Application December 19, 1950, Serial No. 201,512

4 Claims. (Cl. 251—301)

This invention relates to new and useful improvements in valves, and, more particularly, to new and useful improvements in rotary valves for the handling of liquid flows containing solids in suspended condition, such as paper pulp slurry, sewage, etc.

It is an object of this invention to provide a valve wherein an improved journal sealing arrangement provides sealing pressure as well as friction, to prevent rotation of the rotary member of the valve, to prevent extrusion of sealing material, and to prevent material in the flow from entering the upper journal of said valve.

It is a further object of this invention to provide a valve having an improved seat whereby the shape of the seat in the valve body provides approximately the same width of seating area at essentially all points in relation to the rotation of the rotary member; and to provide a rotary member which shuts off tightly to prevent the flow of fluid through the valve.

It is a further object of this invention to provide an improved valve having an eccentric rotary member and an eccentric seat therefor.

It is a further object of this invention to provide a valve with an automatic locking device to prevent the valve from slamming shut.

It is a further object of this invention to provide a valve wherein the rotary member of said valve is provided with a resilient facing for engaging the valve seat so that the flow of fluid may be completely stopped therethrough.

It is a further object of this invention to provide a valve wherein at least one cooperating valve facing is provided with both resilient and metal facings so as to provide both metal to metal sealing, and a resilient member to metal sealing.

It is a further object of this invention to provide an eccentric resiliently faced rotary member for cooperating with an eccentric protruding valve seat.

Other and further objects of the present invention are those inherent in the apparatus as pictured, described, and claimed.

The invention will be described with reference to the drawings in which corresponding numerals refer to the same parts, and in which:

Fig. 2 is a top plan view of the instant invention;

Figure 3 is a fragmentary end elevation showing the locking device of the instant invention in locked position;

Figure 4 is a fragmentary view similar to a part of Figure 3, but partly in section, and showing the locking device in unlocked position;

Figure 9 is a sectional view taken along the line 9—9 of Figure 1, but with the valve gate removed therefrom.

Figure 1:
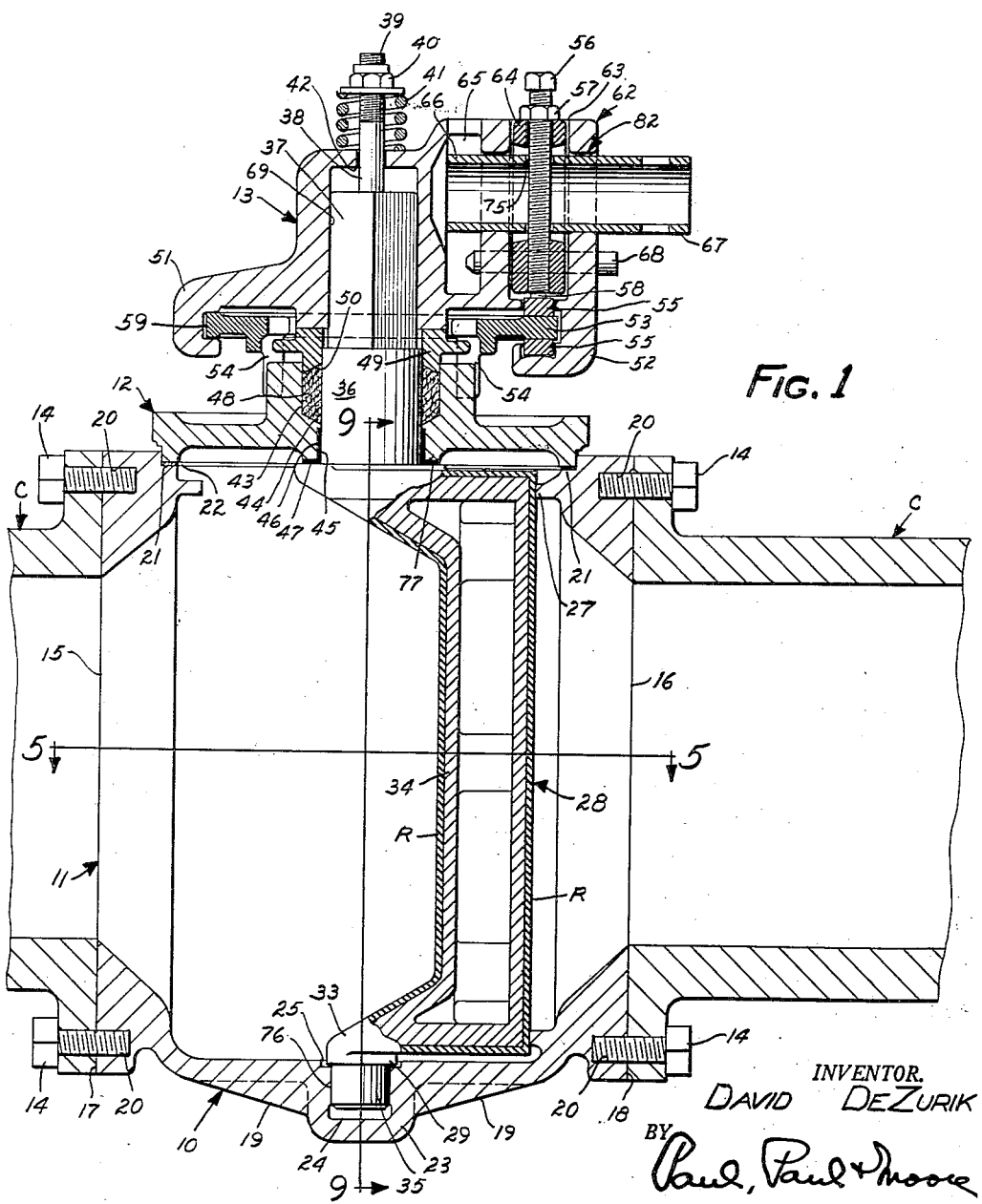
Figure 1 is a side elevation of the present invention, partly in section, and taken along the lines 1—1 of Figure 2.

Referring now to the drawings, and especially to Figure 1, it will be seen that the valve 10 comprises a body, generally designated 11, a cap, generally designated 12, and a locking device disposed on the top of said cap, generally designated 13. Valve 10 is disposed intermediate a conduit C adapted for the flow of fluids, or fluids with solids in suspension therethrough. Said conduit C is secured to valve body 11 by cap bolts 14 or other suitable means and provides an inlet and an outlet corresponding to inlet port 15 and outlet port 16 of valve 10. The conduit is usually tubular in nature and made of steel or other metallic material for the purpose of carrying fluid, either with or without solid suspended matter, therethrough.

This invention is particularly adapted to be used for the valving of conduits through which pass suspended solids in a fluid carrier, as for example, wood pulp, sewage, etc., wherein heavy pressures are produced and a strong, tightly closing valve is needed which will not slam shut, as will be more fully described hereinafter.

Figure 6:
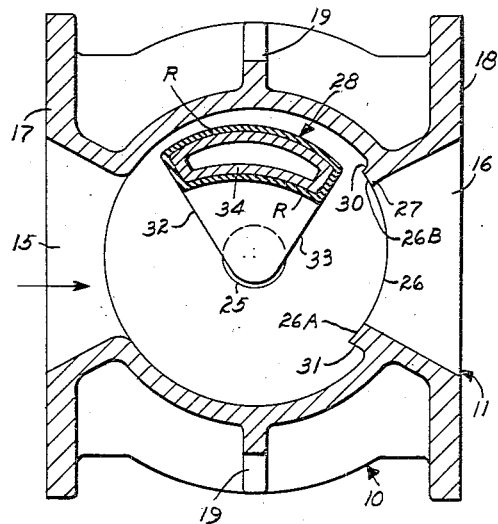
Figure 6 is a view similar to Figure 5, showing the valve plug in open position.
Figure 5:
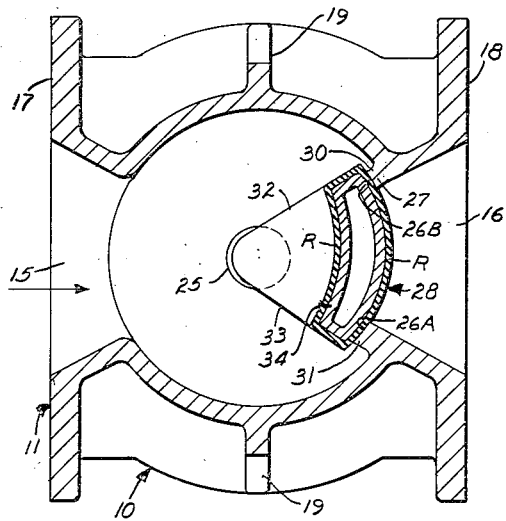
Figure 5 is a top plan sectional view along the lines 5—5 of Figure 1, showing the valve plug in closed position.

Valve body 11 has an interior of generally cylindrical shape. The exterior is provided with flanges 19 and flattened end portions 17 and 18 as is best shown in Figures 5 and 6. The body is preferably fabricated by casting, and is provided with webs 19 for extra strength. Flattened end portions 17 and 18 are circular, as shown in Figure 3, and form face plates. In Figure 3 face plate 18 is illustrated with port 16 disposed in the center thereof. Face plate 17 and port 15 are not shown, but are substantially identical with face plate 18 and port 16. Face plates 17 and 18 are provided with threaded holes 20 to receive bolts 14.

The top and bottom of the valve body are generally planar in nature. The top is open and is recessed as at 21 to form a seat for cap 12. A gasket 22 is inserted between cap 12 and seat 21. Cap 12 may be screwed in place or held by bolts. The bottom of valve body 11 has a depending portion 23 in the center thereof and webs 19 extending therefrom as is best seen in Figure 1. Depending portion 23 is hollow and comprises a well 24 with an enlarged portion 25 at the top forming a seat for shoulder 29 and a machined bearing surface at 76.

The ports 15 and 16 are of inwardly enlarged configuration, as best shown in Figure 1. The inward surface of at least the outlet port 16 has parallel sides and a top and bottom which taper to rounded points as is best shown for port 16 in Figure 9. Port 15 may be of the same configuration or it may be oval or other shapes. Extending inwardly from the lip of port 16 is a seat 27 having the same configuration as port 16. This seat 27 protrudes as is best shown in Figure 1, and has a width 26A as shown in Figure 9 which is not uniform around the port opening. Thus, the side sections 26 are considerably wider than the tapered end sections 26b. This provision of a narrowing tapered end section as contrasted with relatively wider parallel side sections is provided so as to cooperate with the configuration of gate 28, whereby the same width of seat 27 will be exposed to the rotation of the rotary gate 28 at the ends of the port as at the sides.

In other words, when the valve is used on a flow which carries suspended solids or fibrous materials, the cooperation of the width of the seat with the configuration thereof causes a relatively equal amount of material to be caught between the seat and the gate face all around the port opening thereby insuring tight shut off. It has been found that this arrangement permits a tighter shut-off, especially when handling fibrous material. Otherwise, if the seat were of uniform width, a greater amount of fibrous material would be caught between the seat and the gate at the ends and leakage would occur around the sides.

Valve seat 27 is of the configuration of port 16, extends inwardly therefrom, and is eccentric in nature with respect to the axis of rotation of the gate 28. Thus, it protrudes inwardly, toward the center of valve body 11 a greater distance on the terminal side 31 of the valve seat 27 than it does on the initial side 30. This may best be seen with reference to Figures 5 and 6, wherein it is shown that the radius of the valve seat about the axis of rotation of gate 28 diminishes in the direction of closing rotation of gate 28, in this case a clockwise direction when viewed from the top. Consequently, the radius of the valve seat 27 is more at its initial edge 30 than at its terminal edge 31. Correspondingly, the radius of the valve gate 28 increases in the direction of closing rotation, so that the radius of edge 32 is greater than that of edge 33 in order to cooperate with the valve seat.

The valve gate 28 consists of a horizontally opening U-shaped member 34, from which depends a short shaft 35 journaled for rotation in well 24. This short shaft is provided with a shoulder 29 adapted to be seated in seat 25. The U-shaped member is covered with a resilient material designated R, and may be constructed in any manner, preferably of light, hollow casting.

At the upper end of the U-shaped member 34 is provided a shoulder 77 and a spindle 36, with a hexagonal upper portion 37. The spindle 36 is further provided with a reduced portion 38 which is threaded at 39. A nut 40 is threaded thereon, and a spring 41 engages a washer seated against the under surface of said nut, and the upper surface of locking member 13 with expanding pressure. The upper surface of locking member 13 is provided with an aperture 42 through which reduced end portion 38 of the spindle passes.

Cap member 12 has a central bore therein comprising an enlarged portion 43 having a downwardly and inwardly slanting shelf 44 and a reduced portion 45. The reduced portion 45 is recessed for the insertion of a sheath of resilient material 46, as shown in Figure 1. The resilient material sheath 46 also extends outwardly a short distance around said central base on the bottom of cap 12, as is best shown at 47 in Figure 1.

Packing material in the form of a circular gasket 48 is inserted in the enlarged portion 43 so that it rests upon shelf 44. A circular gland member 49 has an inwardly and upwardly sloping bottom 50 which in turn rests upon the top of packing or gasket 48. The top of this gland member abuts the bottom of locking member 13 as is shown in Figure 1.

Locking means 13 has a pair of depending crooks 51 and 52. Locking ring 53 is cradled by crooks 51 and 52 and has fingers 54 extending downwardly therefrom for interlocking engagement with depressions situated in cap 12. Carried by the crook 52 of locking means 13, are a pair of friction bars 55 which are disposed in transverse longitudinal recesses therein, whereby they are movable with a cage 62, when a handle 67 is oscillated. An adjustable bolt 56 provided with an adjusting nut 57 has a terminal end 58 which engages the top one of the two friction bars 55.

Locking ring 53 is of the shape shown best in Figure 2 and is provided with a reduced radial portion at 59 which terminates at 60 to form a stop for crook 51 when the valve is in the open position. This reduced portion 59 terminates at its opposite end in an indentation 61 which is provided so that crook 51, and hence locking means 13 can be removed therefrom after nut 40 is released from threaded spindle end 39.

Locking means 13 is provided with a cage 62 which contains a substantially rectangular well 63 for the insertion of rocking block 64. It also contains an interior space 65 which is of the configuration best shown in Figures 1 and 2, and permits free movement of the end 66 of handle 67. This interior space 65 is separated from the rectangular well 64 by ledges 79 and 81. 79 and 81 may be vertical ledges, or they may be the side walls of an aperture similar to an aperture 82 provided in the rear wall of cage 62, as is best shown in Figure 3. When the valve is in a static position, either open or closed, handle 67 will be eccentrically disposed in aperture 82, abutting ledge 79 and the wall of aperture 82 at 78, as shown best in Figure 3. The handle-receiving openings in the block 64 are relatively larger than the handle 67 to permit the handle to be alternately oscillated about the ledges 78 and 79 in operation of opening and closing the valve. A pivot pin 68 is provided which maintains rocking block 64 in well 63 so that block 64 will pivot therein and upon a horizontal axis around pivot pin 68. Locking means 13 is also provided with a central bore 69 which is hexagonal in shape and adapted to slip over hexagonal member 37.

Case 62 is provided with a rearwardly extending recess 70 in which is seated coil spring 71 which engages boss 72 of rocking block 64. Block 64 is provided with a circular aperture 73 of the shape best shown in Figures 1 and 2 which has central ridge 74, as shown in Figure 2. Handle 67 is slipped loosely in block 64 and maintained therein by the passage of bolt 56 through aperture 75 therein.

When the valve is in the closed position of Figure 1, the eccentric gate member 28 engages eccentric seat 27, as shown in Figure 5. Depending shaft 35 is situated in well 24 and bears upon bearing surface 76. The resilient material sheath 46 of cap member 12 encompasses and is engaged by the lower edge of spindle 36. Pressure of spring 41 upon nut 40 pulls spindle 36 upwardly so that shoulder 77 of gate 28 engages resilient material sheath 46 at 47. Pressure of spring 41 also causes locking member 13 to be pressed downwardly upon gland member 49 and the sloping shoulder 50 of gland member 49 engages packing ring 48 and compresses it between said shoulder and shelf 44, insuring a snug fit. This type of sealing arrangement with the resilient material recessed in the cap 12 and the spring 41 on top thereof, provides both sealing pressure as well as friction for holding the rotary gate 28 in position against rotation. It prevents extrusion of sealing material, and insures that material in the flow will not enter the central bore. The friction developed by the spring 41 forcing shoulder 77 against resilient member 46 aids in preventing rotation of the gate 28 by the flow through the valve.

The resilient sheathing R of U-member 34 insures that the gate 28 will close tightly against seat 27. The configuration of the seat 27 in the valve body 11 provides the same seating width at essentially all points in relation to plug rotation. This is important when the valve is used for valving the flow of any fluid which contains solids in suspension, or fibrous materials in a fluid carrier. This seat configuration, in cooperation with the tapered width of the seat causes a relatively equal amount of material to be caught between the seat and the rotary gate face all around the port opening, thereby insuring tight shut off.

Adjustable bolt 56 is adjusted and locked by nut 57 so that end 58 presses upon the upper one of friction blocks 55 with sufficient pressure to maintain the valve gate 28 in open position against the force of the flow of fluid. The configuration of aperture 73 and the dimension thereof, together with interior space 65 insures that handle 67 will be somewhat loosely accommodated upon bolt 56 and central ridge 74.

When the valve is in a static position, either open or closed, rocking block 64 will be in the position shown in Figures 2 and 3. In this position spring 71 will bear against recess 70 and boss 72 to constantly maintain rocking block 64 in the position shown in Figure 3, thus bolt 56, which is threaded through rocking block 64 will constantly engage the upper one of the pair of friction blocks 55 at its terminal end 58 by forcing upper block 55 against ring 53, force the latter against lower block 55 and hence to lock the rotary member 28 against movement. In other words, spring 71 causes blocks 55 to act as brake shoes which grip the braking surface 53 and hence hold the valve against movement so long as rocking block 64 is not tipped, and the block 64, being tipped by handle 67, accordingly rocks back to braking position whenever handle 67 is slowed down in movement.

When it is desired to move the valve gate 28, from the closed position of Figure 2, handle 67 is grasped at the end thereof and moved counter clockwise (with reference to Figure 2) until crook 51 is arrested by terminal end 60 and the valve gate 28 is then in an open position. When handle 67 is moved in said counter clockwise position, it pivots about bolt 56 within the space provided by interior space 65 and aperture 82. When this pivotal movement is initiated, end 66 on handle 67 will bear on ledge 79 and handle 67 will move away from aperture wall 78, thus forcing rocking block 64 from the position shown in Figure 3 to the position shown in Figure 4, thus releasing the pressure of terminal end 58 of bolt 56 upon the top member of friction elements 55 and allowing the locking means 13 and consequently the valve gate 28 to rotate freely to an open position determined by the bottom of crook 51 on terminal 60. When it is desired to return the valve to the closed position, handle 67 would be grasped and moved in a clockwise direction (with reference to Figure 2) until eccentric valve gate 28 is seated tightly against valve seat 27 and movement of the gate and locking means 13 is arrested by such seating. The valve means will then be closed and the locking means will be in the position shown in Figure 2.

When the handle 67 is moved in a clockwise direction it will pivot about pivot bolt 56 and will bear upon aperture wall 78. It will pivot away from ledge 79 and thus rocking block 64 will be moved from the position shown in Figure 3 to the position shown in Figure 4 and the locking means 55—53—55 will again be released and the valve gate freely movable.

A novel feature of this invention is the fact that should the pressure on valve gate 28 be sufficiently strong it may tend to urge the valve gate 28 from the position shown in Figure 6 to the position shown in Figure 5. Under conditions of extreme pressure the valve gate 28 will be urged very rapidly into the position of Figure 5, and the valve will be "slammed shut." This does not allow optimum regulation of flow shut-off, and when the pressure is sufficiently great it may cause undue wear and tear upon major parts.

To prevent such "slamming shut" tendency, this novel locking apparatus is so constructed that when the valve handle 67 is being moved in a clockwise direction to close the valve gate 28, and the pressure of the fluid on valve gate 28 should be such as to accelerate the closing of the gate at a speed faster from the speed at which the operator is manually closing said gate by movement of the handle 67, the relatively faster pivotal speed of gate 28, and consequently spindle 37, may force cage 62 in a clockwise direction faster than handle 67, which may cause rocker 64 to assume the position shown in Figure 2, whereby the friction blocks 55 will frictionally engage ring 53 and thus prevent the valve from slamming shut. Handle 67 may then again engage ledge 79 and aperture wall 78, whereupon rocker block 64 will once again be moved from position shown in Figure 3 to position shown in Figure 4. Thus, the gate cannot close at a speed faster than that desired by the operator.

Figure 7:
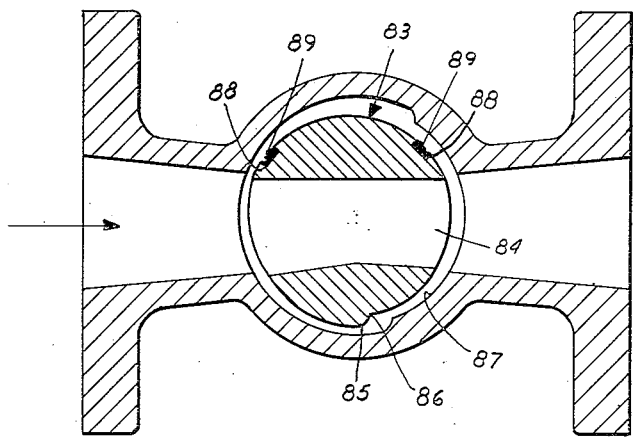
Figure 7 is a top plan section of a modified form of the present invention with the valve in open position.
Figure 8:
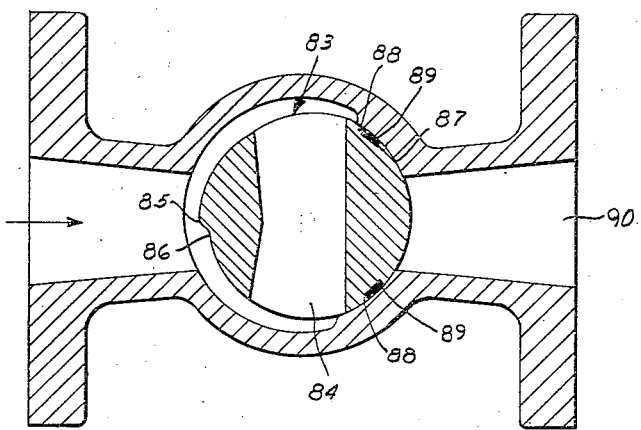
Figure 8 is a view similar to Figure 7, with the valve in closed position.

A modification of this invention is shown in Figures 7, and 8. In this modification a true plug 83 with a passage 84 therethrough is provided. The plug 83 is eccentric in nature and has a radius which diminishes in a clockwise direction from point 85 to point 86 as is best shown with reference to Figures 7 and 8. A valve seat 87 is again provided of the same configuration as heretofore described but with a somewhat greater width of seating area as is shown in Figures 7 and 8. A rectangular recess 88 of circular configuration is provided as shown in Figures 7 and 8. Resilient material 89 is affixed securely in said recess and is adapted to completely encircle valve port 90 when the valve is in the closed position of Figure 8, thus there is provided a metal facing between the rotary plug and the valve seat.

The resilient member to metal facing insures a tight seating of the eccentric gate in the eccentric valve face and provides a leak-proof seal. The metal-to-metal facing insures that should the resilient material become disintegrated by reaction with the fluid flowing through the valve or should it become burned out for some reason, the valve will still be operative to stop flow of fluid thereto by means of the metal-to-metal facing.

As many widely different embodiments of this invention may be made without departing from the spirit and scope thereof, it is to be understood that I do not limit myself to the specific embodiments described herein.

What I claim is:

1. In a valve of the class described, having an inlet and an outlet, a valve body disposed therebetween and a rotary member disposed within said valve body for rotation therein, a protruding rotary member contacting seat circumscribing said outlet and adapted to be wiped by said rotary member, said seat including two protruding parallel side portions, each comprising a rotary member engaging face of substantially constant width, said seat including two end portions each having two converging rotary member engaging faces of diminishing width, said rotary member being pivoted on an axis parallel to the side portions and adapted to move across the valve seat from one side to the other.

2. In a valve of the class described, having an inlet and an outlet, a valve body disposed therebetween and a rotary member disposed within said valve body for rotation therein, a protruding rotary member contacting seat circumscribing said outlet and adapted to be wiped by said rotary member, said seat including two protruding parallel side portions, each comprising a rotary member engaging rectangular face of substantially constant width, said seat including two end portions each having two converging member engaging faces, said last faces joined together at their converging ends and joined to said side portions at their diverging ends, each last face having a diminishing width from its diverging to converging end, said rotary member being pivoted on an axis parallel to the side portions and adapted to move across the valve seat from one side to the other.

3. The apparatus of claim 1 further characterized in that said rotary member is provided with a resilient facing for engaging said protruding rotary member contacting seat.

4. The apparatus of claim 3 further characterized in that said rotary member and said protruding rotary member contacting seat each provide a metal surface and said resilient facing is in the form of a continuous strip of resilient material so disposed upon said rotary member that a metal-to-metal contact and a resilient facing-to-metal contact with said protruding rotary member contacting seat is provided when the said rotary member is in engagement with said seat.

References Cited in the file of this patent

UNITED STATES PATENTS

| 347,727 | Morrin | Aug. 17, 1886 |
| 425,756 | Conway | Apr. 15, 1890 |

(Other references on following page)

UNITED STATES PATENTS

| | | |
|---|---|---|
| 524,922 | Walsh | Aug. 21, 1894 |
| 987,334 | Theis | Mar. 21, 1911 |
| 1,028,134 | Raymaker | June 4, 1912 |
| 1,493,784 | Larson | May 13, 1924 |
| 1,872,417 | Dalldorf | Aug. 16, 1932 |
| 1,929,362 | Liva | Oct. 3, 1933 |
| 2,078,903 | Domack | Apr. 27, 1937 |
| 2,103,536 | Inge | Dec. 28, 1937 |
| 2,346,892 | Aldrich | Apr. 18, 1944 |
| 2,424,210 | Sutton | July 15, 1947 |
| 2,504,863 | Monroe | Apr. 18, 1950 |
| 2,505,270 | Allen | Apr. 25, 1950 |

FOREIGN PATENTS

| | | |
|---|---|---|
| 2,574 | Great Britain | of 1887 |
| 785,155 | France | Aug. 3, 1935 |
| 624,406 | Germany | Jan. 20, 1936 |
| 701,260 | Germany | of 1941 |
| 62,272 | Denmark | of 1944 |